United States Patent [19]

Yamada et al.

[11] Patent Number: 5,235,380
[45] Date of Patent: Aug. 10, 1993

[54] CAMERA HAVING DEVICE FOR DISPLAY WITHIN VIEWFINDER

[75] Inventors: Akira Yamada; Naohiko Hayashi, both of Kanagawa, Japan

[73] Assignee: Canon Kabushiki Kaisha, Tokyo, Japan

[21] Appl. No.: 648,195

[22] Filed: Jan. 31, 1991

[30] Foreign Application Priority Data

Feb. 5, 1990 [JP] Japan .................................... 2-25483
Feb. 7, 1990 [JP] Japan .................................... 2-29297

[51] Int. Cl.⁵ .............................................. G03B 17/18
[52] U.S. Cl. .................................... 354/471; 354/409; 354/474
[58] Field of Search .................. 354/409, 195.13, 471, 354/474, 475, 466, 478

[56] References Cited

U.S. PATENT DOCUMENTS

| | | | |
|---|---|---|---|
| 3,971,048 | 7/1976 | Ito et al. | 354/475 |
| 4,035,815 | 7/1977 | Takahashi | 354/471 |
| 4,294,529 | 10/1981 | Sato et al. | 354/466 |
| 4,367,463 | 1/1983 | Suzuki et al. | 354/409 |
| 4,475,800 | 10/1984 | Kinoshita et al. | 354/409 |
| 4,597,659 | 7/1986 | Suda et al. | 354/409 |
| 4,827,303 | 5/1989 | Tsuboi | 354/409 |

Primary Examiner—Russell E. Adams
Attorney, Agent, or Firm—Robin, Blecker, Daley & Driscoll

[57] ABSTRACT

A camera is provided with two display devices, one for making a superimposed display of information inside an image plane frame within a viewfinder and the other for displaying information outside the image plane frame. The superimposed display is controlled to be made for a shorter period of time than the display made outside the image plane frame, so that the viewfinder can be sighted without being hindered by the superimposed display.

15 Claims, 13 Drawing Sheets

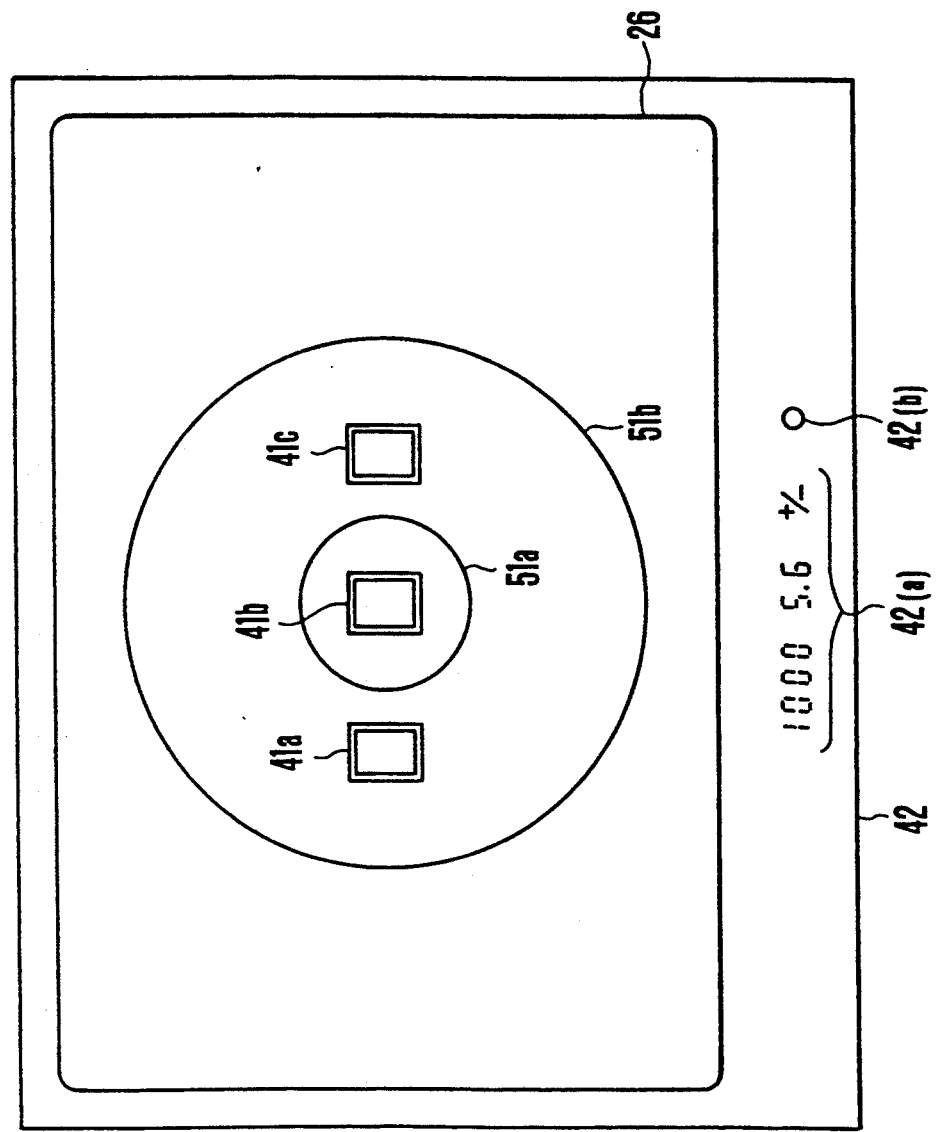

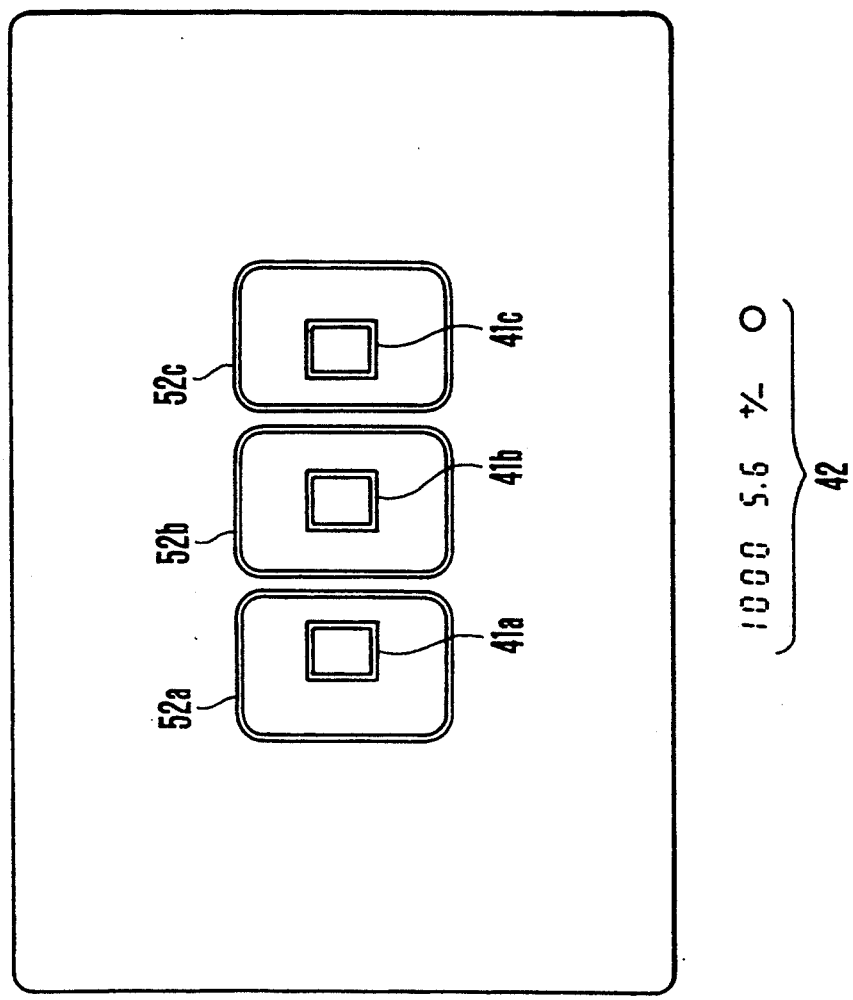

CAMERA HAVING DEVICE FOR DISPLAY WITHIN VIEWFINDER

BACKGROUND OF THE INVENTION

1. Field of the Invention:

This invention relates to a display device for making a display within the viewfinder of a camera.

2. Description of the Related Art:

It has generally been practiced to display such photographic information as shutter time and aperture values outside an image plane within the viewfinder of a camera. Meanwhile, the recent advancement of electronic technology for semiconductors, photo-sensors, etc., has practicalization of such cameras that are arranged to be capable of automatically detecting the distances of a plurality of distance measuring points within the image plane (automatic focusing) and measuring the degrees of luminance of objects located within a plurality of ranges. It is desirable to have these distance measuring points and the light measuring ranges displayed within the image plane to permit selection of them by a person operating the camera while looking into the viewfinder. To improve the operability of the camera in this respect, some display devices have been arranged to make a superimposed display within the image plane.

However, the contents of the superimposed display appear within the image plane in a state of being overlapped on an object image even when it is no longer necessary and rather a hindrance after it has been noticed by the photographer. Another problem resides in that the ability to discern of the superimposed display greatly varies with the brightness of the object image.

SUMMARY OF THE INVENTION

It is an object of this invention to provide a display system wherein there are provided in combination a display device which is arranged to make a superimposed display within the image plane of a viewfinder and an outside-frame display device which is arranged to make an outside-frame display for displaying information outside a frame of the image plane of the viewfinder; and, in making the superimposed display and the outside-frame display, the duration of the superimposed display is set at a shorter period of time than that of the outside-frame display, so that the above-stated problems presented by the superimposed display can be solved.

It is another object of the invention to provide a camera which is arranged under the above-stated object to make the duration of the superimposed display variable with the sequence of photographing processes of the camera, so that a superimposed display can be made for a period of time suited for the purpose of the superimposed display.

It is a further object of the invention to provide a display device for a camera which is arranged under the above-stated object in such a manner that, in making a superimposed display, the luminance of the display is adjusted according to the output of light measurement, so that the superimposed display can be made in an easily discernible state.

The above and other objects and features of the invention will become apparent from the following detailed description of embodiments thereof taken in conjunction with the accompanying drawings.

BRIEF DESCRIPTION OF THE DRAWINGS

FIG. 9 shows a viewing field of the viewfinder of the embodiment of FIGS. 8(A) and 8(B), including matters displayed within the viewfinder.

FIG. 11 shows a viewing field of the viewfinder including matters displayed within the viewfinder of the camera of FIG. 10.

DETAILED DESCRIPTION OF THE PREFERRED EMBODIMENTS

Figure 1:
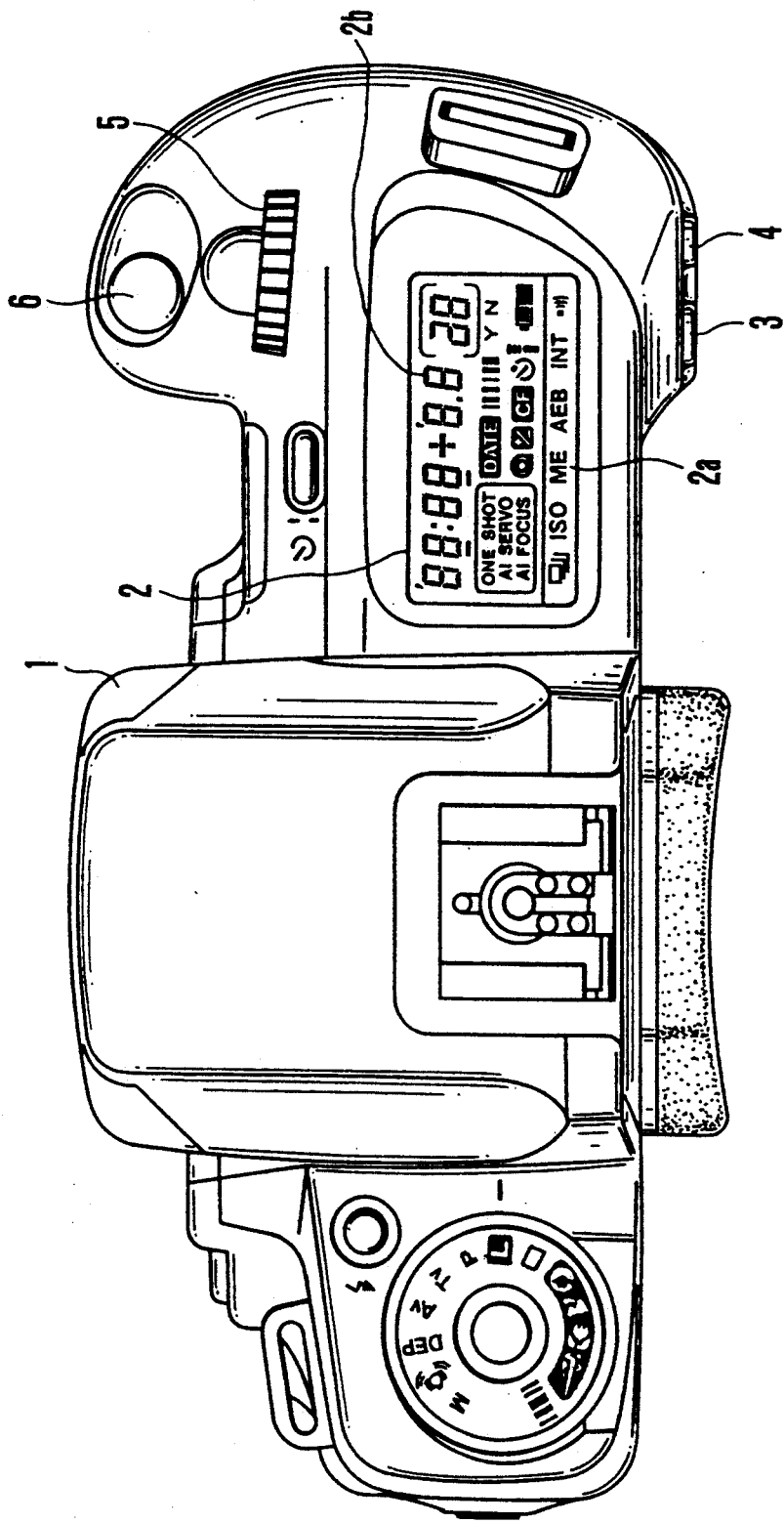
FIG. 1 is a top view showing a camera provided with a display selection device arranged according to this invention.
Figure 2:
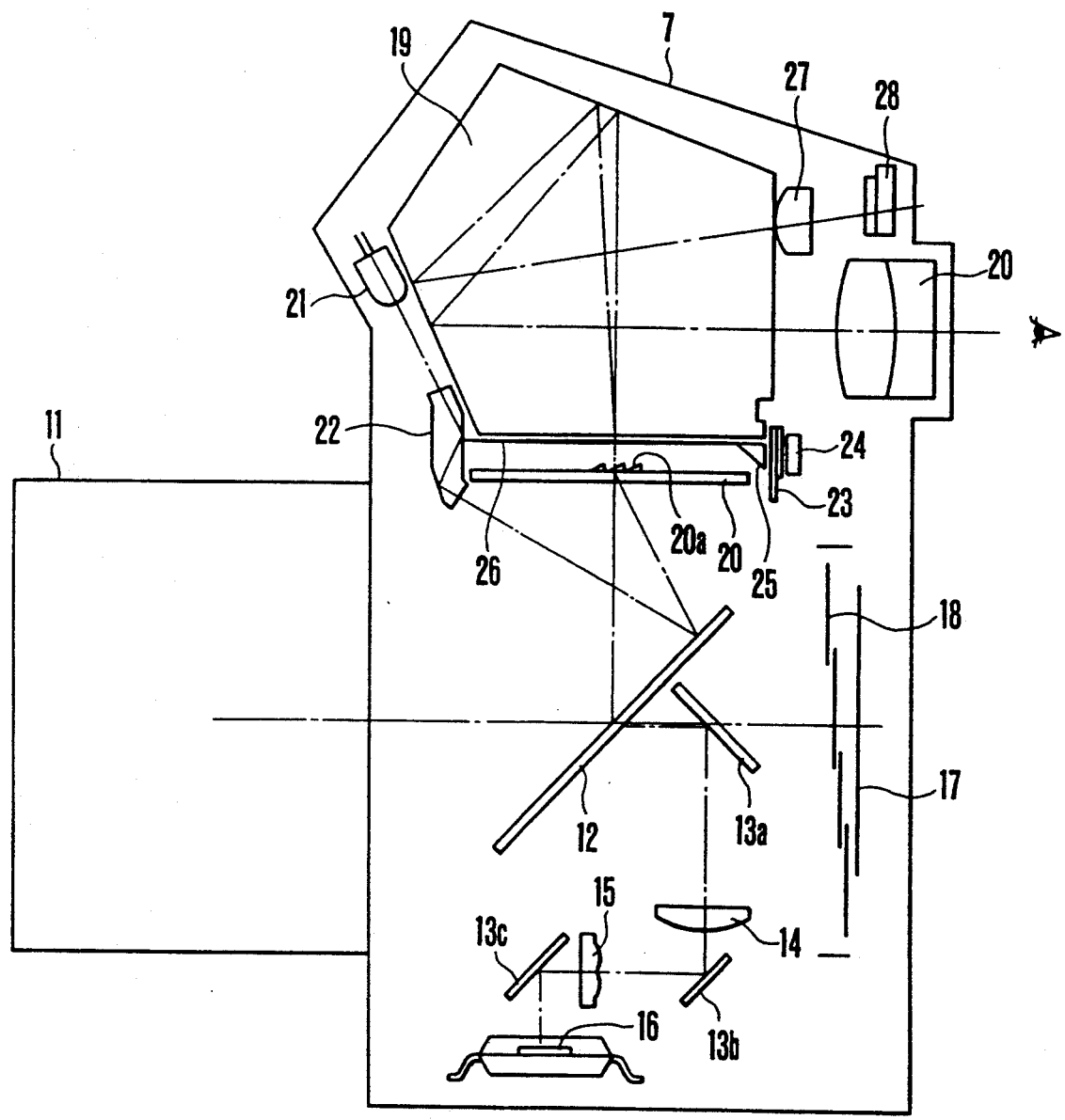
FIG. 2 is a sectional view taken across the middle part of the camera having the invented display selection device.

The following describes the details of this invention through some of preferred embodiments thereof:

FIGS. 1 and 2 show an automatic focusing (hereinafter abbreviated to AF) type single-lens reflex camera which is provided with a display device arranged according to this invention, FIG. 1 showing it in a top view and FIG. 2 in a sectional view taken across its middle part.

Figure 3:
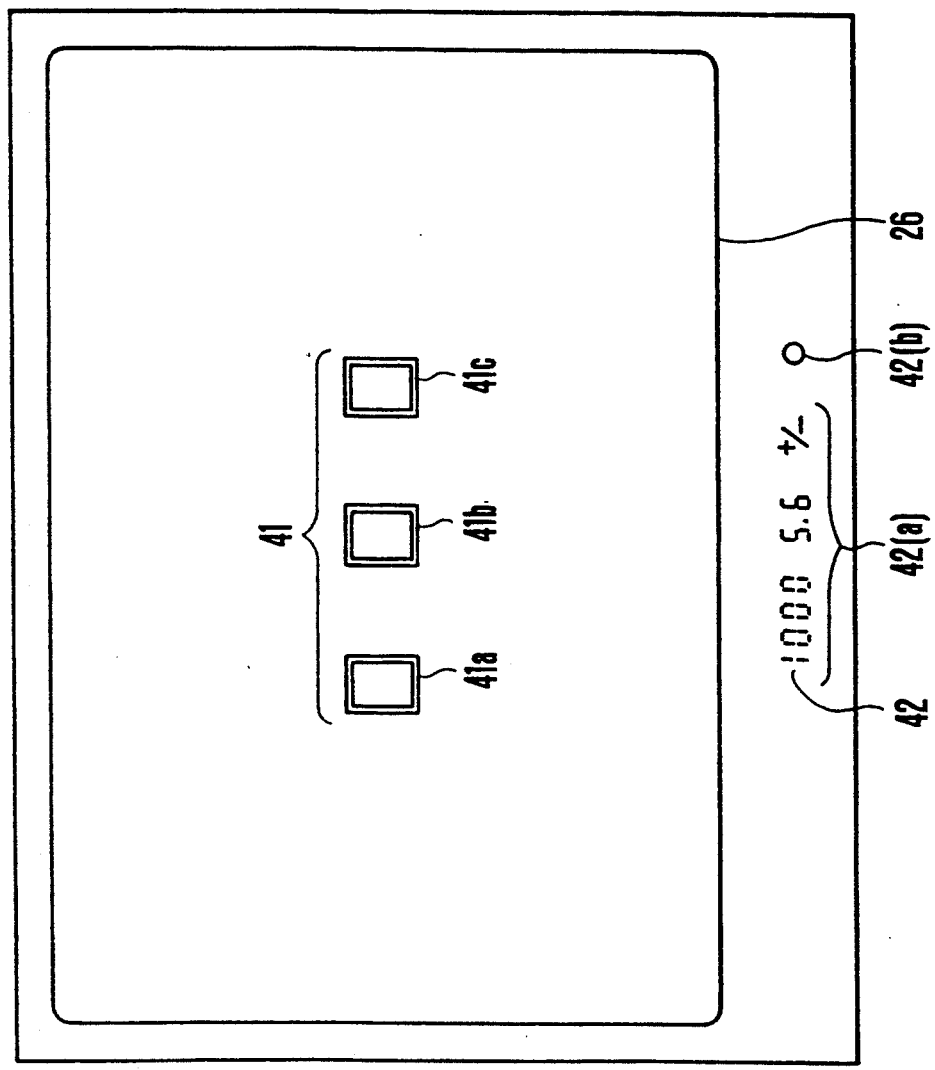
FIG. 3 shows a viewing field of a viewfinder including matters displayed within the viewfinder of the same camera having the invented display selection device.

A reference numeral 1 denotes a camera body. A liquid crystal display (hereinafter abbreviated to LCD) device 2 is employed as an external monitor display device (or a display device DISP1). The LCD device 2 consists of a fixed segment display part 2a which displays predetermined patterns and a seven-segment display part 2b which displays variable numerical values. A distance measuring point mode selection button 3 is provided for selection of one of a plurality of distance measuring points for AF and is arranged to put the camera into a state of selecting a distance measuring point every time it is pushed. A light-measuring mode selection button 4 is provided for selection of one of a plurality of light measuring ranges and is arranged to put the camera into a state of selecting a light measuring range every time it is pushed. A dial (DL) 5 is arranged such that, when it is turned, click pulses are generated to vary the set values of the shutter time, the aperture, etc., of the camera or its photographing mode such as the distance measuring point mode and the light measuring mode. A reference numeral 6 denotes a shutter release button. In FIG. 2, a reference numeral 11 denotes a photo-taking lens. A main mirror 12 is composed of a half-reflection mirror. A sub-mirror group 13 is arranged to guide light to an AF optical system and consists of three sub-mirrors 13a, 13b and 13c. The illustration includes a field lens 14; a secondary image forming lens 15; and a known CCD line sensor 16 which is disposed in a position equivalent to a film plane 17 and is arranged to serve as focus detecting means for detecting the focus of the photo-taking lens 11 which is arranged to give information on the right, middle and left parts of the image of an object to be photographed. The CCD line sensor 16 consists of charge-coupled devices CCD-L, CCD-C and CCD-R. The illustration further includes a shutter 18; a pentagonal prism 19; a focusing screen 20; and an ultra-high luminance LED (light emitting diode) 21 which emits such a light that is discernible even within a bright object. The light emitted by the LED 21 is reflected by a light projection prism 22 and the main mirror 12. The reflected light is perpendicularly bent by a minute prism array 20a which is disposed in the display part of the focusing screen 20. The bent light comes to the eye of the photographer via the pentagonal prism 19 and an eyepiece lens 20. The minute prism array 20a is formed in a frame-like shape on the focusing screen 20 in positions corresponding to the distance measuring points of the CCD-L, CCD-C and CCD-R. The minute prism array 20a is arranged to be illuminated by the LED 21 including three LEDs LED-L, LED-C and LED-R which correspond to the above-stated distance measuring points respectively. As apparent from the viewing field of the viewfinder shown in FIG. 3, this arrangement enables distance measuring frames 41a, 41b and 41c to light up within the viewing field of the viewfinder in such a way as to display the light measuring points respectively. The display which is made in this manner will be hereinafter called the superimposed display. An LCD device 23 (a display device DISP2) which is provided for displays within the viewfinder is arranged to be illuminated by an illumination LED 24 (FLED). The light of the LED 24 which passes through the LCD device 23 is guided to the inside of the viewfinder by a triangular prism 25 to make a display 42 outside the frame of the viewing field of the viewfinder as shown in FIG. 3. This gives photographic information to the photographer. This outside-image-plane display 42 includes an exposure information display 42(a) and an in-focus display 42(b) which indicates the in-focus state of the photo taking lens 11. Like the LCD device 2 (DISP1), the LCD device 23 (DISP2) include a 7-segment display part which is arranged to show the same matters as the 7-segment display part of the LCD device 2. A reference numeral 26 denotes a frame of the viewing field. The illustration of FIG. 2 further includes a condenser lens 27 for measuring light; and a photo-sensor 28 consisting of two photo-diode parts SPC-C and SPC-S which are arranged to be capable of measuring the luminance of the central part of the object and that of the peripheral part of the object respectively.

Figure 4:
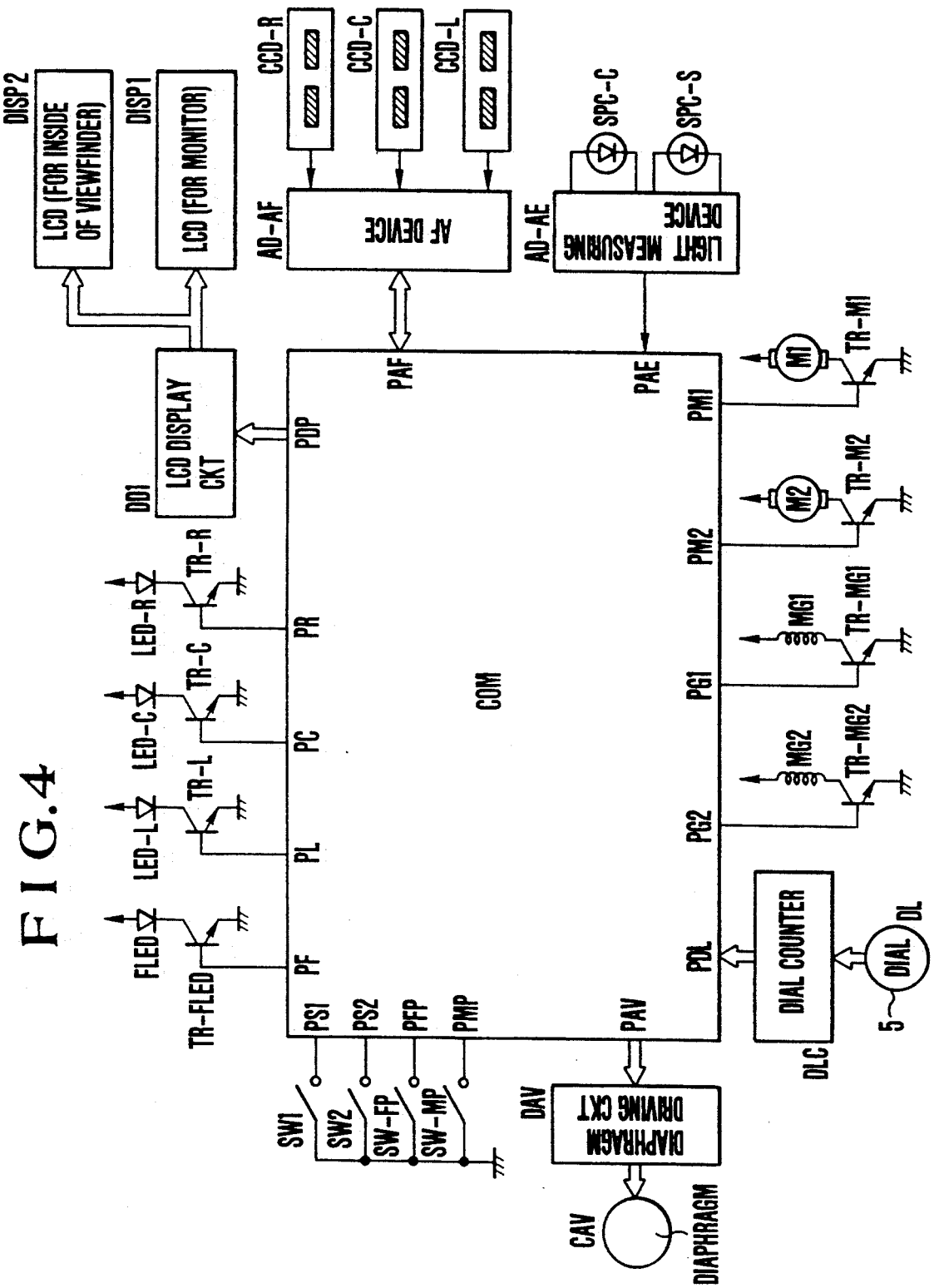
FIG. 4 is a diagram showing the electrical circuit arrangement of the camera having the display selection device.

FIG. 4 shows the internal electrical circuit arrangement of the camera of FIG. 1. Referring to FIG. 4, a microcomputer COM which is arranged to control the camera and is provided with input ports PS1, PS2, PFP, PAE and PMP; an 8-bit input port PDL; output ports PAV, PR, PC and PL; an 8-bit output port PDP; and an 8-bit input/output port PAF. An automatic focusing (AF) device AD-AF is arranged to analog-to-digital (A/D) convert a voltage which is received as an image signal from each of the sensors CCD-R, CCD-C and CCD-L; to compute the degree of defocus for each of the distance measuring points on the basis of the image signal which is received from each sensor and digitized; and to adjust the focus of the lens by driving the lens with a motor (not shown) in accordance with the result of computation. A light measuring device AD-AE is arranged to logarithmically compress the voltages obtained from the light measuring sensor 28 (SPC-C and SPC-S) and to A/D convert the voltages. A known display circuit DD1 is arranged to make, in accordance with signals received from the above-stated output port DPD, an LCD display showing among others an aperture value, a shutter time value and a photographing mode selected. LCD devices DISP1 and DISP2 are provided for external monitoring and for a display within the viewfinder and correspond to the LCD devices 2 and 23 mentioned in the foregoing. These LCD devices DISP1 and DISP2 are arranged to be caused to make their displays simultaneously. Reference symbols TR-R, TR-C, TR-L, TR-FLED, TR-M1, TR-M2, TR-MG1 and TR-MG2 denote transistors. A motor M1 is arranged to wind and rewind a film. Another motor M2 is arranged to move the mirror 12 up and down and to charge the shutter. A magnet MG1 is arranged to allow a leading shutter curtain to travel when a current is applied thereto. Another magnet MG2 is arranged to allow a trailing shutter curtain to travel when a current is applied thereto. A dial counter DLC is arranged to count the number of turning clicks made by the dial (DL) 5 and to supply the result of count to the above-stated port PDL. A diaphragm driving circuit DAV is arranged to control the aperture of a diaphragm CAV in accordance with information on a number of stopping-down steps received from the above-stated port PAV. A light measuring switch SW1 is arranged to be turned on by a first stroke of a pushing operation on the shutter release button 6. An exposure start switch SW2 is arranged to be turned on by a second stroke of the shutter release button pushing operation. A distance measuring point mode selection switch SW-FP is arranged to be caused to select one of the distance measuring points by a pushing operation on the distance measuring point mode selection button 3.

A light measuring mode selection switch SW-MP is arranged to select one of the light measuring ranges in response to a pushing operation performed on the light measuring mode selection switch 4.

Figure 5:
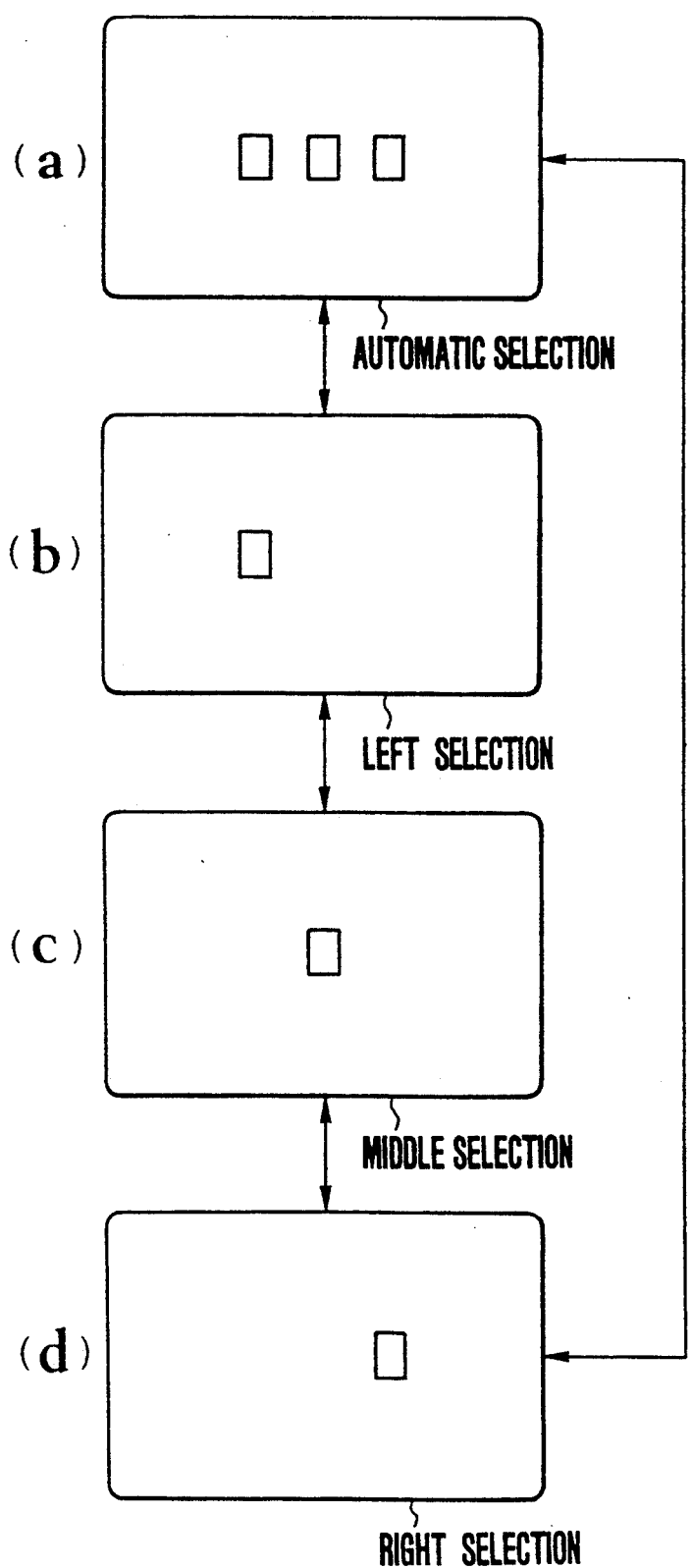
FIG. 5 shows superimposed displays made in different distance-measuring-point selecting states within the viewfinder of the camera having the invented display selection device.

FIG. 5 shows various states of a superimposed display obtained within the image plane of the viewfinder when the distance measuring point mode selection button 3 is pushed to select the distance measuring point.

In FIG. 5, a part (a) shows a state where all the three distance measuring points are functioning and thus indicates an automatic selection mode in which one of these points are automatically selected by the camera in accordance with a predetermined algorithm. All the distance measuring frames 41a, 41b and 41c are lighted up in the automatic selection mode. Each of other parts (b), (c) and (d) shows a distance measuring point mode in which the left, middle or right distance measuring point is selected and the frame 41a, 41b or 41c is lighted up as applicable.

Figure 6A:
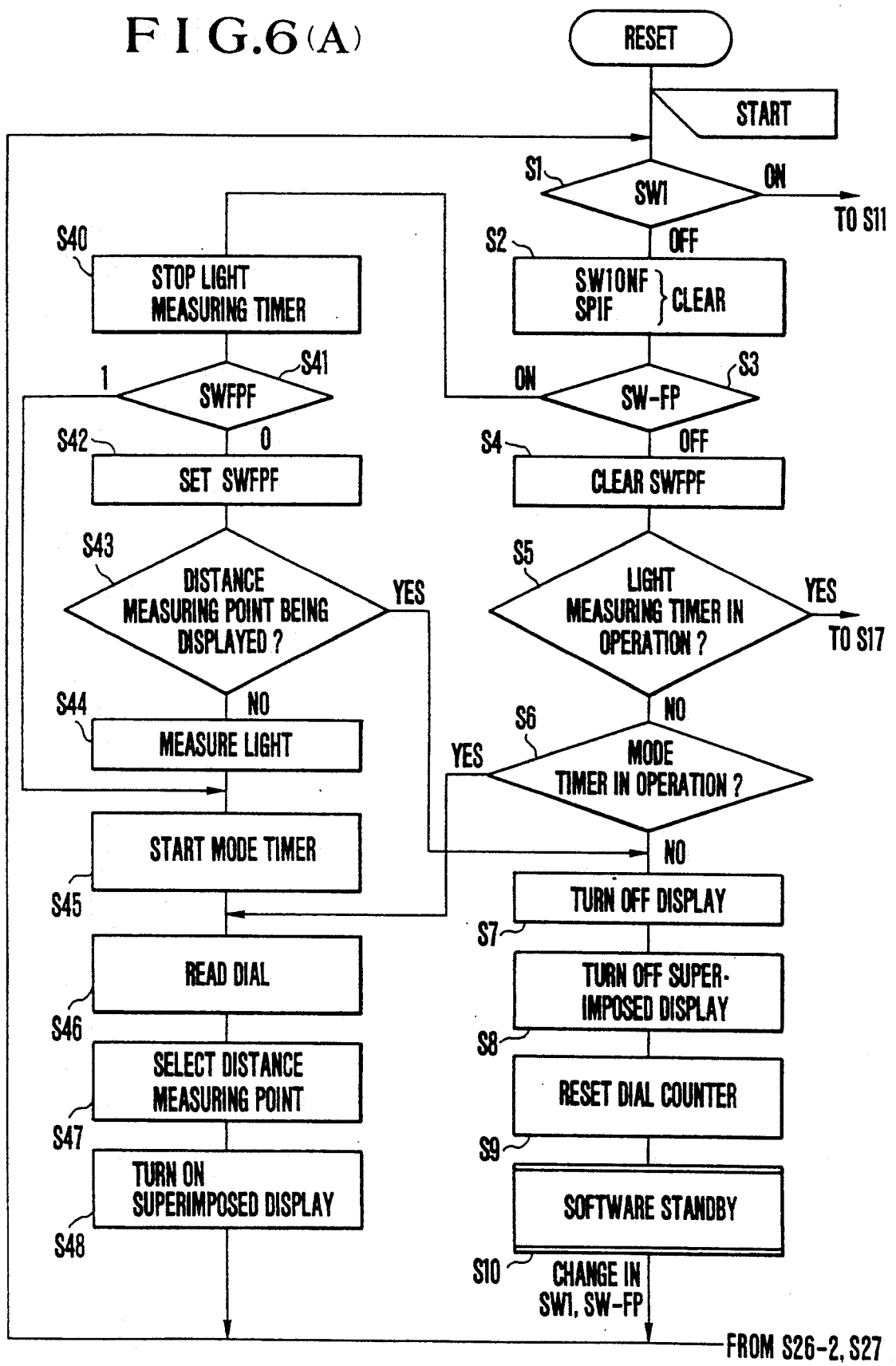
FIGS. 6(A), 6(B) and 7 are flow charts showing the operation of the camera which is provided with the invented display selection device.

The camera operates as described below with reference to FIGS. 6(A), 6(B) and 7 which are flow charts.

When a power supply for the camera is switched on, all the RAMs of the microcomputer COM are cleared, each of input and output ports is initialized and a program begins to perform its control from "START".

At a step S1: A check is made for the state of the switch SW1. If the level of the input port PS1 is low, the flow of operation comes to a step S11. If it is found to be high, the flow proceeds to a step S2.

Step S2: A flag SW1ONF which indicates that the switch SW1 is on (in an on-state) and a flag SPIF which indicates that an in-focus distance measuring frame within the viewfinder is lighted up (hereinafter referred to as the superimposed display) after an in-focus state is attained are cleared. The flow then proceeds to a step S3. Step S3: A check is made for the state of the switch SWFP. The flow comes to a step S40 if the level of the input port PFP is low or proceeds to a step S4 if it is high. Step S4: A flag SWFPF which indicates that the switch SW-FP is on is cleared and the flow proceeds to a step S5. Step S5: A check is made to find if a light measuring timer which starts at a step S27 is in operation. If so, the flow comes to the step S17. If not, the flow proceeds to a step S6. Step S6: A check is made to find if a mode timer which starts at a step S45 is in operation. If so, the flow comes to a step S46. If not, the flow proceeds to a step S7. Step S7: An OFF signal is supplied from the output port PDP to the LCD display circuit DD1 to turn off the LCD display. After that, the flow proceeds to a step S8. Step S8: Low level outputs are produced from the output ports PR, PC and PL to turn off the superimposed display. The flow then proceeds to a step S9. Step S9: The above-stated dial counter DLC is cleared to "0" and the flow proceeds to a step S10.

Step S10: The microcomputer COM is put into a software standby state. In the software standby state, not only the microcomputer proper but also a clock device and other incorporated peripheral modules cease to function, so that the current consumption can be greatly reduced. However, as long as a specified amount of voltage is supplied, the contents of registers and data stored in the RAM of the microcomputer COM can be maintained. The software standby state is canceled by a drop of power supply voltage, a change in the state of the switch SW1 and that of the switch SW-FP.

The microcomputer COM is released from the software standby state when the switch SW1 is pushed again. Then, the flow proceeds from the step S1 to the step S11.

At the step S11, the dial counter DLC is cleared to zero and the flow proceeds to a step S12. Step S12: The mode timer is stopped and the flow proceeds to a step S13. Step S13: A check is made to see if the flag SW1ONF indicating a pushed state of the switch SW1 is set. If so, the flow comes to a step S16. If not, the flow comes to a step S14-1. At the step S14-1, the superimposed display is turned off. At a step S14-2: A superimposed display corresponding to a selected distance measuring point is lighted up. For example, in cases where the automatic selection mode is selected as the distance measuring mode, the outputs of the port PL, PC and PR are produced at a high level to light up all the left, middle and right superimposed displays. In this instance, luminance modulation is made according to a measured value under the programmed duty control of the microcomputer. The superimposed displays are put out by an interruption process which takes place after the lapse of 50 msec.

Step S15: The flag SW1ONF is set and the flow proceeds to a step S16. Step S16: A known focus detecting action is performed for the distance measuring point selected. Information on the distance measuring point is stored in a RAM called FPRAM. The content 0, 1, 2 or 3 of the RAM (FPRAM) corresponds to the automatic distance measuring point selection mode or the left, middle or right distance measuring point. Therefore, if the RAM (FPRAM) is at 0, a focus detecting action is performed by defocus computation for all the distance measuring points on the basis of the image signals produced from the sensor CCD-R, CCD-C and CCD-L for these points. After that, one of the results of the defocus computing operation on these distance measuring points is selected. In a case where the content of this RAM is 1, 2 or 3, the focus detecting action is performed by carrying out the defocus computing operation for the applicable distance measuring point on the basis of the applicable image signal. The lens is then driven accordingly by means of a lens driving motor which is not shown. After that, the flow proceeds to a step S17. Further, an algorithm which is employed for the above-stated process is arranged, for example, to select one of the defocus degrees which is obtained by focus detection and represents the nearest distance among them.

At the step S17: The light of the superimposed display comes into the light measuring sensor SPC and, therefore, the light measuring action cannot be accurately performed while the superimposed display is being lighted up. In view of this, the flow is held in abeyance until the light of the superimposed display is put out. After that, the flow comes to a step S18. Step S18: Information coming from the light measuring sensor SPC to the light measuring device AD-AE is logarithmically compressed and A/D converted to carry out a light measuring action in a known manner. After completion of it, the flow proceeds to a step S19. Step S19: Shutter time and aperture values are obtained from a measured light value on the basis of a program chart. The flow then proceeds to a step S20.

Step S20: A check is made for the state of the switch SW2. If the switch SW2 is found to be on, the flow proceeds to a shutter release routine. If it is found off, the flow proceeds to a step S21-1.

Step S21-1: A check is made for an in-focus state according to the defocus degree detected by the focus detecting action performed at the step S16. If this defocus degree is within a given in-focus range, an in-focus flag has been set. Therefore, at the step S21 1, a discrimination is made between an in-focus state and an out-of-focus state by making the check for the in-focus flag. The flow proceeds to a step S21-2 if the lens is determined to be in focus or to a step S21-3 if the lens is out of focus.

Step S21-2: The in-focus display 42(b) is lighted up by turning the transistor TR-FLED on to light up the light emitting diode FLED. Step S21-3: The abovestated in-focus display is caused to blink at 2 Hz.

Step S22: A check is made for the flag SPIF which indicates that the superimposed display has been lighted up after attainment of an in-focus state. If this flag is found to be set, the flow comes to a step S25. If not, the flow proceeds to a step S23. Step S23: The flag SPIF is set and the flow proceeds to a step S24.

Step S24: One of the superimposed displays corresponding to the in-focus distance measuring point is lighted up. For example, if the middle distance measuring point is found to be in focus, the output of the port PC is produced at a high level to cause the middle superimposed display to light up. In this instance, a luminance modulating action is performed according to the measured value of light under the programmed duty control of the microcomputer. The light of the superimposed display is put out by an interruption process which is arranged to take place after the lapse of 70 msec.

Step S25: The LCD display circuit DD1 causes the shutter-time and aperture values obtained at the step S19 to be displayed on the LCD device DISP1, for example, as 1/1000 and F 5.6. The other LCD device DISP2 which is also connected to the LCD display circuit DD1 is caused to likewise display 1/1000 and F 5.6. The flow then proceeds to a step S26-1. Step S26-1: A check is made for the state of the switch SW1. If the level of the input port PS1 is high, the flow proceeds to a next step S26-2 to turn off the in-focus display and then comes back to the START. If the level of the input port PS1 is low, the flow comes to a step S27. Further, at the step S26-2, the in-focus display of the steps S21-2 and S21-3 is inhibited thereafter until the switch SW1 is again turned on. Step S27: A light measuring timer which is arranged to count six seconds is caused to start. The shutter-time and aperture values TV and AV are kept on display while the light measuring timer is operating. The timer is brought to a stop by an interruption process which takes place after the lapse of six seconds.

The actions performed at the steps described above can be summarized as follows: the flow of operation comes to steps S11, S12 and S13 when the switch SW1 is turned on. When the switch SW1 changes its state from an off-state to the on-state, the flag SW1ONF is still in a state of being cleared. Therefore, the flow proceeds to the step S16 through the steps S14-1, S14-2 and S15. At the step S14-2, the display of the distance measuring frame 41a, 41b or 41c is superimposed for 50 msec according to the value stored in the RAM (FPRAM) which corresponds to the distance measuring point selected.

After that, the focus is adjusted for the distance measuring point selected at the step S16. Then, the superimposed display is brought to a stop after the lapse of 50 msec and the flow proceeds to the steps S18, S19, S20 and S21-1. If an in-focus state is found at the step S21-1, the distance measuring point for which the in-focus state is obtained is displayed by superimposing it for a period of 70 msec at the steps S21-2, S22, S23 and S24. If not, the flow proceeds to the steps S21-3, S25, S26 and S27 without making any superimposed display and then comes back to the step S1.

In the second round of processes after the step S1, the focus adjusting action and the light measuring action of the steps described in the foregoing are repeated without any superimposed display of the selected distance measuring point, because the flag SW1ONF is set at "1".

Further, the superimposed display to be made at the step S24 with an in-focus state attained is made only in the first round when the in-focus state is attained.

Next, the operation to be performed when the switch SW2 is turned on is described as follows: with the switch SW2 turned on, the program flow branches from the step S20 to a step S28 of the release routine. At the step S28: The dial counter DLC is cleared and the flow proceeds to a step S29. Step S29: The light measuring timer is brought to a stop and the flow proceeds to a step S30. Step S30: Low level outputs are produced from the output ports PR, PC and PL to turn off the superimposed display and the flow proceeds to a step S31. Step S31: Like at the step S25, the shutter-time and aperture values are displayed and the flow proceeds to a step S32. Step S32: A high-level output (or signal) is produced from the output port PM2. The motor M2 is driven by this signal to move the mirror up and the flow proceeds to a step S33.

At the step S33: A signal for a number of aperture stopping-down steps is supplied from the output port PAV to the diaphragm driving circuit DAV. The aperture of the diaphragm CAV is stopped down under the control of the signal. The flow then proceeds to a step S34. Step S34: An actual shutter time value is computed from the APEX value of shutter time. The timer is set accordingly. The flow proceeds to a step S35. Step S35: A high-level signal is produced from the output port PG1 to have a current applied to the magnet MG1. This causes the leading shutter curtain to travel. The flow proceeds to a step S36. Step S36: The flow waits for the lapse of the actual time as counted by the timer and, after that, comes to a step S37. Step S37: A high-level signal is produced from the output port PG2 to have a current applied to the magnet MG2. The magnet MG2 then allows the trailing shutter curtain to travel. After that, the flow proceeds to a step S38. Step S38: A high-level signal is produced from the output port PM2 to drive the motor M2 to move the mirror down. The flow proceeds to a step S39. Step S39: A high-level signal is produced from the output port PM1. This causes the motor M1 to wind the film. The flow then comes back to the "START" of the program.

In changing the distance measuring point from one point over to another, when the distance measuring point mode selection button is operated to push the switch SW-FP before the switch SW1 is pushed, the camera operates as follows: with the switch SW-FP pushed while the switch SW1 is open, the program flow comes from the step S3 to a step S40. At the step S40, the operation of the abovestated light measuring timer is brought to a stop. The flow then comes to a step S41. At the step S41, a check is made to see if the flag SWFPF is set. If so, the flow comes to a step S45. If not, the flow proceeds to a step S42. Step S42: The flag SWFPF is set and the flow comes to a step S43. Step S43: A check is made to see if the distance measuring point is on the superimposed display. If so, the flow comes to the step S7. If not, the flow proceeds to a step S44. Step S44: Like at the step S18, the light measuring action is performed. The flow then comes to the step S45. Step S45: The mode timer which counts six seconds is started. The mode timer is arranged to be brought to a stop by an interruption process which takes place after the lapse of six seconds.

Step S46: A dial count value is read from the dial counter DLC. The flow then proceeds to a step S47. Step S47: The value read out from the dial counter is added to a value stored in the RAM (FPRAM). If, for example, the count value read out is 2 while the value of this RAM is 0, the value stored at the RAM changes to 2, which indicates that the distance measuring point becomes the middle point If the read-out count value is 4 while the value of the RAM (FPRAM) is 2, the value of the RAM changes to 3, which indicates that the distance measuring point becomes the right point. In other words, every time the dial counter counts up by one, the value stored at the RAM (FPRAM) varies in the sequence of 0 - 1 - 2 - 3 - 0 and the distance measuring point varies in the sequence of the automatic point - left point - middle point - right point - automatic point. Conversely, every time the dial counter counts down by one, the value of the RAM (FPRAM) varies in the sequence of 0 - 3 - 2 - 1 - 0 and the distance measuring point varies in the sequence of the automatic point - right point - middle point - left point - automatic point.

Step S48: Like at the step S14-2, the superimposed display is made. In this case, however, the light of the superimposed display is not put out after the lapse of 50 msec. Referring again to FIG. 5, the distance measuring frame to be displayed is changed from one frame over to another accordingly as the clicking rotation of the dial (DL) 5 in the following manner: when the dial 5 is turned to the right to the degree of one click at a time for the distance measuring point, the distance measuring frame varies in the sequence of the part (a) the part (b) - the part (c) - the part (d) - the part (a) of FIG. 5. When the dial 5 is turned to the left, the frame varies in the reverse sequence of the part (a) - the part (d) - the part (c) - the part (b) - the part (a). Further, the light measuring action is performed at the step S44 for the purpose of making the superimposed display easily noticeable by modulating the luminance of display on the basis of the result of light measurement when the superimposed display is made by pushing the switch SW-FP.

The steps S40 to S48 described above are executed while the switch SW1 is in an off-state and the switch SW-FP in an on-state. However, since the flag SWFPF is set during the first round of execution of these steps S40 to S48, execution of the steps S42, S43 and S44 is inhibited in the second round of execution of these steps S40 to S48. Further, even if the switch SW-FP is turned off after it has been turned on, the mode timer remains in operation for a period of six seconds when the mode timer starts at the step S45. Therefore, the flow then comes from the step S6 to the step S46. Then, the steps S1, S2, S3, S4, S5, S6, S46, S47 and S48 are repeated while the timer is in operation. This permits selection of any distance measuring point on the superimposed display as desired by operating the dial. Further, the superimposed display is automatically put out after the lapse of the above-stated period of six seconds.

As described above, the distance measuring point selected and set at the step S47 is put on the superimposed display for the period of 50 msec at the step S14-2 immediately after the switch SW1 is pushed.

The foregoing description of the steps of operation of the embodiment of this invention for the display to be made within the viewfinder when an in-focus state is attained and the display of the distance measuring point selected can be summarized as follows.

The superimposed display to be made in selecting the distance measuring point continues for a period of six seconds, which is long enough for enabling the photographer to select one of the distance measuring points. When the switch SW1 turns on from its off-state, the distance measuring point selected is superimposed on the display for a period of 50 msec. When an in-focus state is attained, the distance measuring point for which the in-focus state is attained is put on the superimposed display for a period of 70 msec. In this instance, the in-focus state is displayed outside the image plane of the viewfinder. The display outside the image plane is made only while the switch SW1 is in its on-state and is made in a state of blinking at 2 Hz to give a warning if the lens is out of focus.

Further, the display of shutter time and aperture values TV and AV on the outside of the image plane is arranged to be made either while the switch SW1 is on or for the period of six seconds defined by the light measuring timer after the switch SW1 is turned off.

In the case of the embodiment described, the distance measuring point is arranged to be displayed in the superimposed state. However, the superimposed display is not limited to the distance measuring point. For example, some manual setting value that is set by the photographer, indicating a photographing mode or the like, may be displayed also as a superimposed display.

Figure 8A:
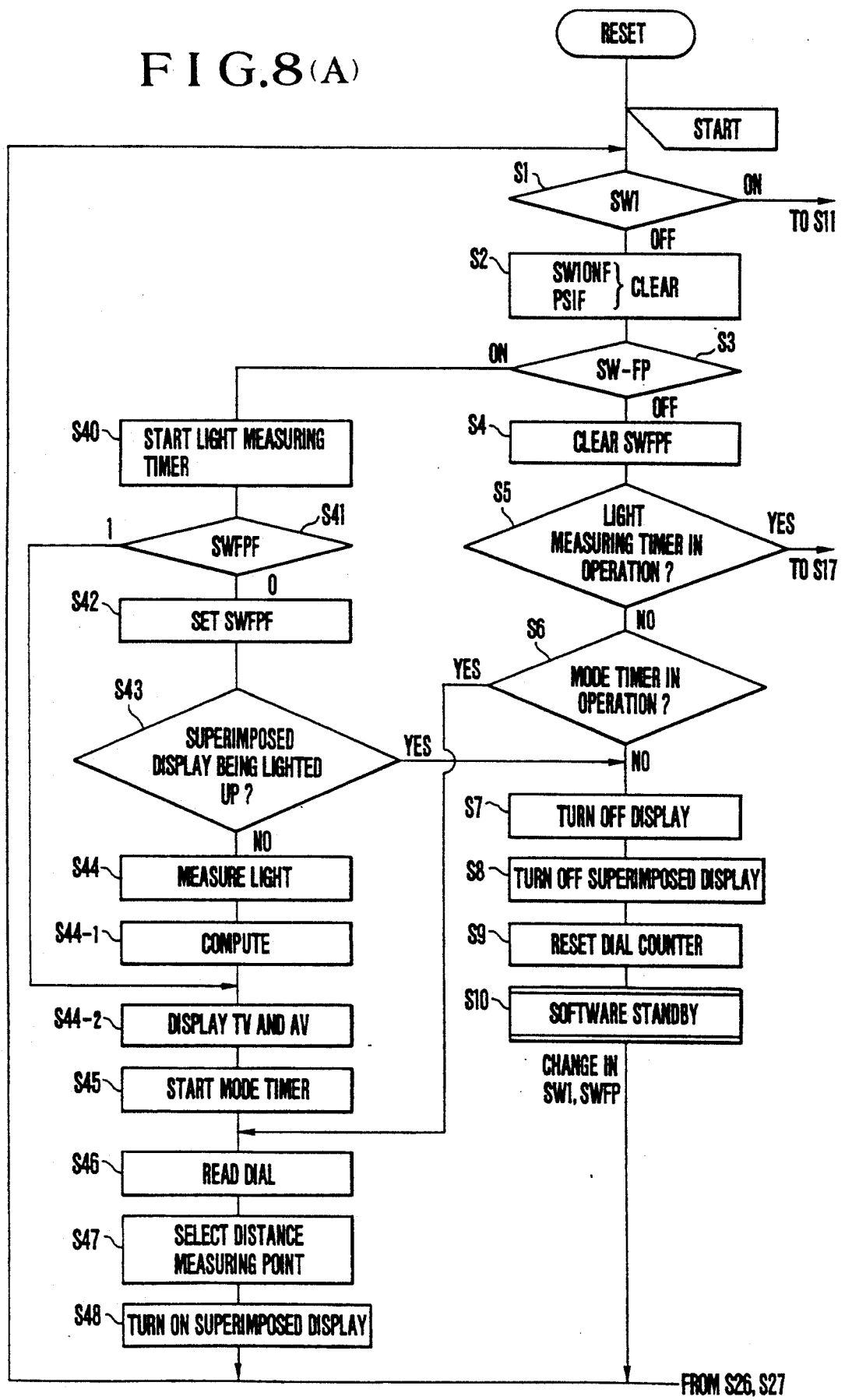
FIGS. 8(A) and 8(B) are flow charts showing the operation of a camera which is arranged as another embodiment of the invention.
Figure 8B:
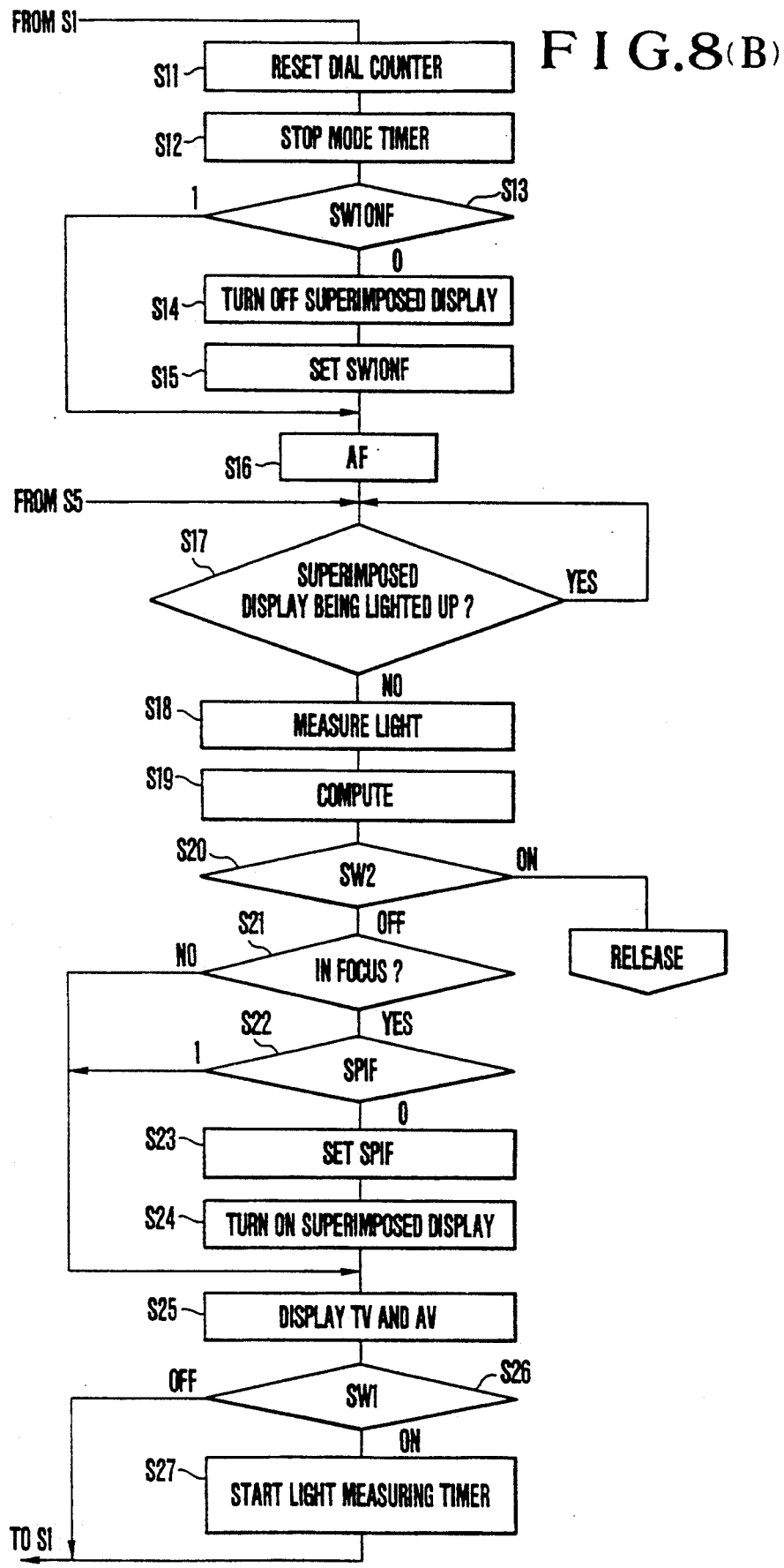

FIGS. 8(A) and 8(B) show a program flow which is arranged as another embodiment of the invention. This flow is about the same as the flow of FIGS. 6(A) and 6(B) described in the foregoing except in the following points.

Figure 6B:
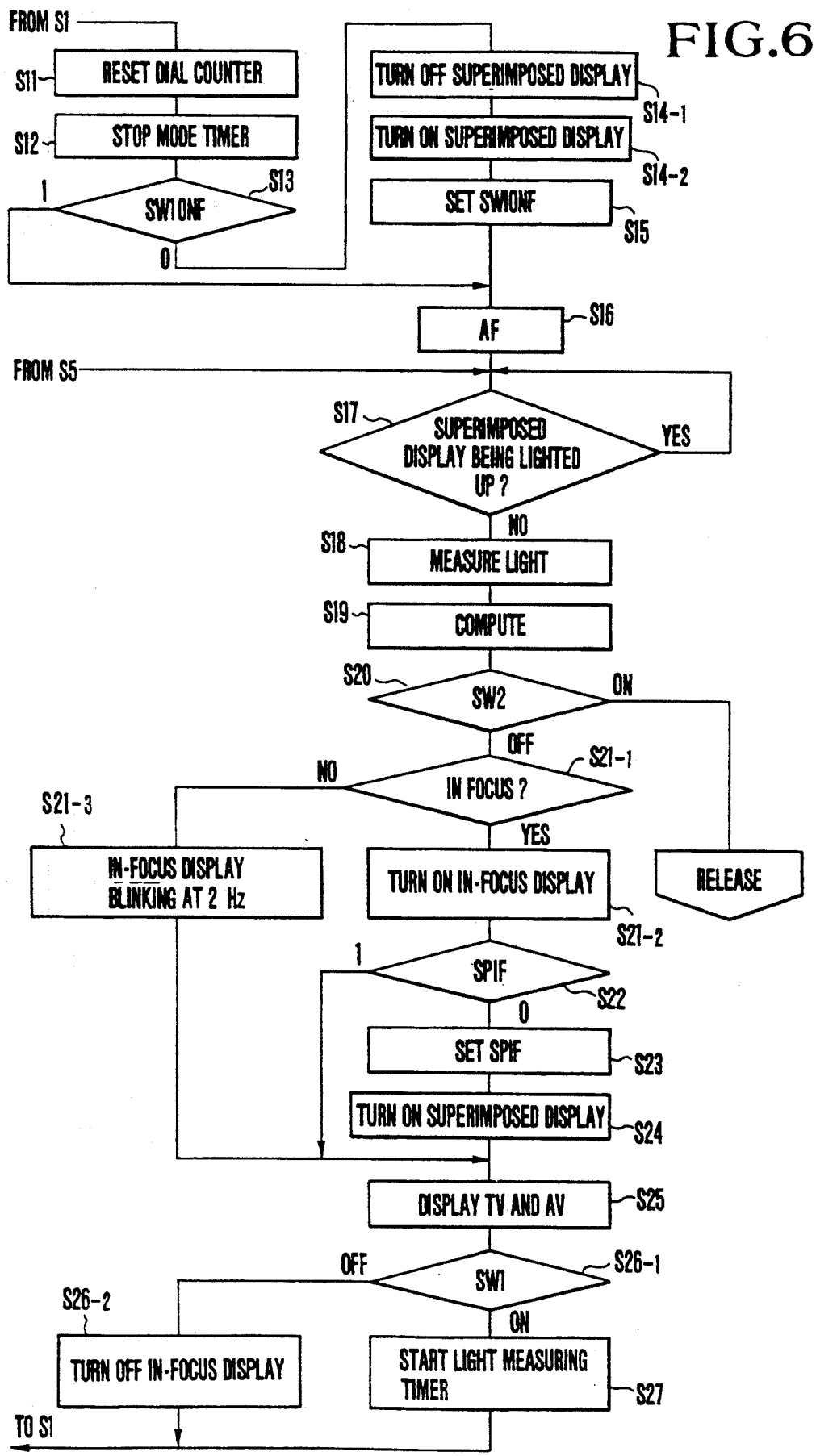
Figure 7:
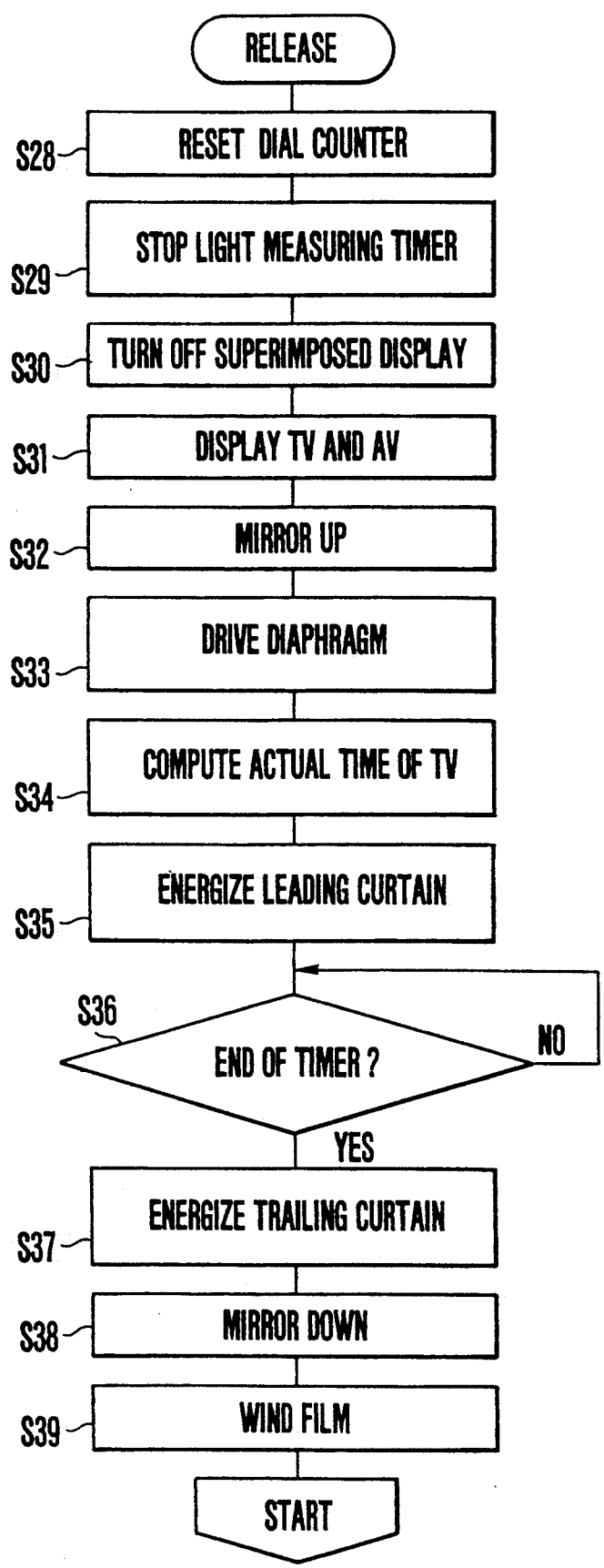

Referring to FIG. 8(B), after the superimposed display is turned off at a step S14 in the same manner as in the case of FIG. 6(B), the superimposed display is not turned on and this embodiment does not make the superimposed display when the switch SW1 is turned on. Further, in this case, the steps S21-2 and S21-3 of FIG. 6(B) are omitted. Therefore, the in-focus display made when an in-focus state is attained and the blinking out-of-focus display made by means of the light emitting diode are excluded from the flow. Further, steps S44-1 and S44-2 are added to a step 44. As a result, computed shuttertime and aperture values are displayed by the display devices DISP1 and DISP2 simultaneously with the display of the selected distance measuring point. With the exception of these points, the flow of FIGS. 8(A) and 8(B) is exactly the same as that of FIGS. 6(A) and 6(B).

While a method for selecting the distance measuring mode has mainly been described in the foregoing for each of the embodiments described, the method applies also to the selection of the light measuring mode in the same manner. For this purpose, the embodiment may be arranged to permit selection of one of two light measuring ranges, for example, in the following manner: with the light measuring mode selection button 4 pushed, a spot light measuring mode in which the luminance of the middle part of the image plane is measured by means of the light measuring sensor SPC-C is displayed through the distance measuring frame 41b; and an average light measuring mode in which the luminance of about the whole of the image plane is measured by using the light measuring sensors SPC-C and SPC-S is displayed by lighting up all the distance measuring frames 41a, 41b and 41c. In this instance also, the luminance or brightness of the superimposed display is preferably arranged to be variable according to a measured value of luminance of the object to be photographed in each of the light measuring modes prior to the superimposed display in the same manner as in the case of pushing the distance measuring point mode selection button. This arrangement makes the superimposed display more readily discernible in contrast with the luminance of the image of the object.

In this instance, the display can be made more conspicuous in terms of luminance by arranging the spot light measuring area 51a of the sensor SPC-C and the average light measuring area 51b of the sensors SPC-C and SPC-S in a positional relation to the distance measuring frames 41a, 41b and 41c as shown in FIG. 9.

Figure 10:
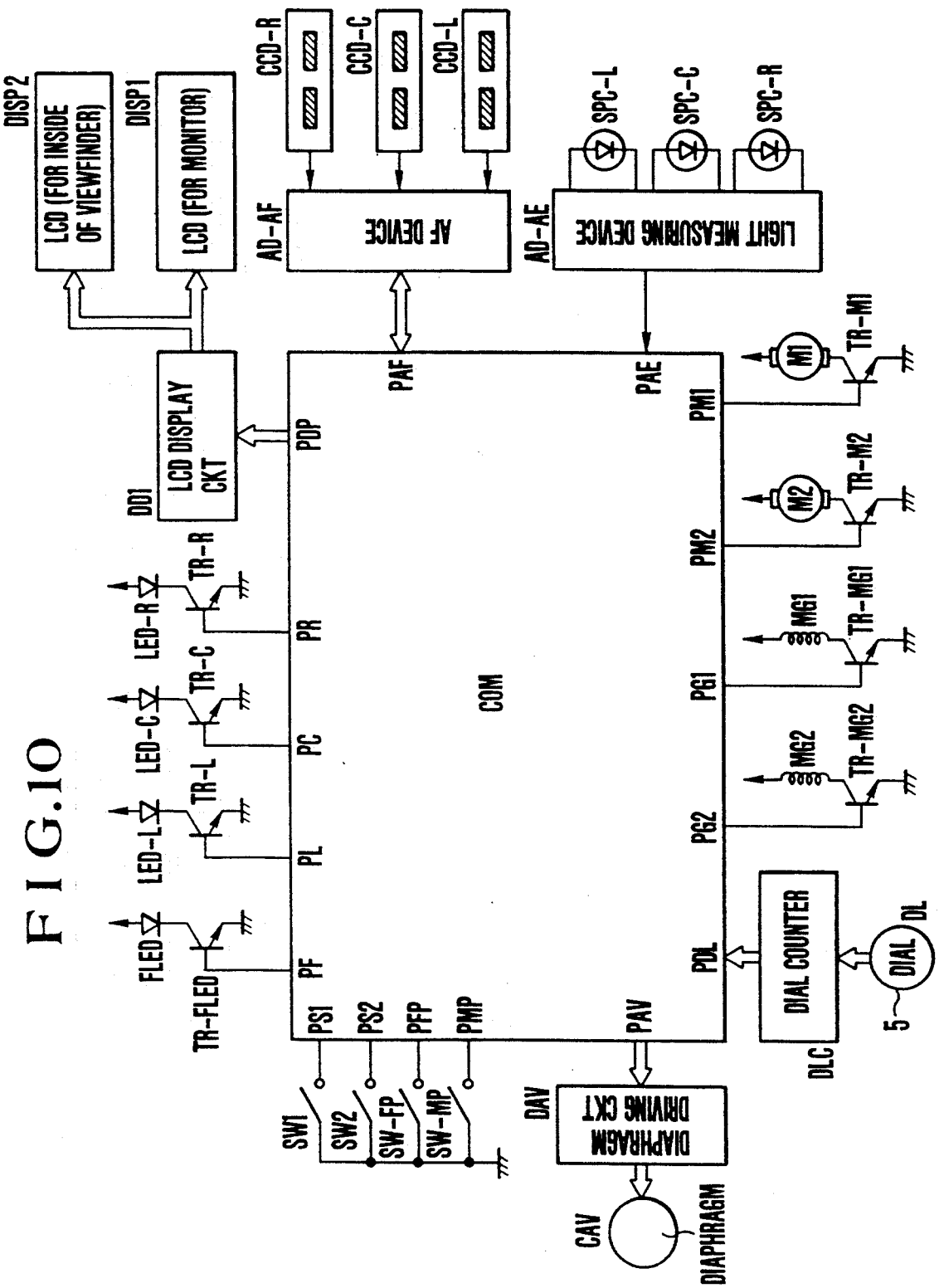
FIG. 10 is a diagram showing the electric circuits of the camera arranged as a further embodiment of the invention.

FIGS. 10 and 11 show a further embodiment of the invention. In this case, as shown in FIG. 10, a light measuring sensor 51 is divided into three photo-diode sensors SPC-L, SPC-C and SPC-R. Each of these sensors is arranged to be capable of performing spot light measurement by individually measuring the light of a corresponding area. Referring to FIG. 11, the light measuring areas 52a, 52b and 52c of these sensors SPC-L, SPC-C and SPC R respectively include distance measuring frames 41a, 41b and 41c. The light measuring areas 52a, 52b and 52c are arranged to permit superimposed displays respectively in the same manner as the distance measuring frames 41a, 41b and 41c. For this purpose, as shown in FIG. 2, minute prisms are formed on a focusing screen 20 for corresponding light emitting diodes LED-L, LED-C and LED R of an LED 21.

This arrangement enables the embodiment to measure the luminance of the object within an area corresponding to each of the distance measuring point (mode) selected. Therefore, even in the event of an object having varied degrees of luminance in its different parts, the luminance of the superimposed display can be adjusted to a most easily noticeable luminance by adjusting the quantity of light emitted by the LED 21. Further, when a distance measuring point is selected, the arrangement enables the embodiment to selectively measure the light of a part corresponding to the selected point. The arrangement, therefore, permits the embodiment to omit the light measuring mode selection button 4 and the light measuring mode selection switch SW-MP. The embodiment not only gives an easily sightable superimposed display but also permits the photographer to see within the viewfinder the measured light value of an area corresponding to each of the distance measuring points. This, therefore, greatly improves the operability of the camera.

What is claimed is:

1. A camera having a device for making a display within a viewfinder, comprising:
   a) a display device operable for displaying information inside an image plane frame of the viewfinder;
   b) a light measuring circuit;
   c) an exposure control circuit arranged to perform an exposure control on the basis of an output of said light measuring circuit; and
   d) operation control means responsive to operation of said display device to inhibit said exposure control circuit from performing the exposure control on the basis of the output of said light measuring circuit obtained for a period of time during which the information is being displayed by said display device.

2. A camera according to claim 1, wherein said exposure control circuit includes a computing circuit arranged to perform an exposure computing operation on the output of said light measuring circuit, and wherein said operation control means is further responsive to termination of operation of said display device to operate said light measuring circuit and said computing circuit thereby to then cause said computing circuit to perform a computing operation on the output of said light measuring circuit.

3. A camera according to claim 1, wherein said display device includes a light emitting means and is arranged to make a superimposed display of information inside said image plane frame within the viewfinder by using light emitted from said light emitting means.

4. A camera according to claim 3, wherein said light measuring circuit is disposed at a pentagonal prism portion of said camera.

5. A camera having a device for making a display within a viewfinder, comprising:
   a) a display device for displaying information inside an image plane frame of the viewfinder, said display device includes light emitting means and is arranged to make a superimposed display of information inside said image plane frame within the viewfinder by using light emitted from said light emitting means;
   b) a light measuring circuit; and
   c) a luminance control circuit arranged to cause said light emitting means to emit light at a degree of luminance determined on the basis of an output of said light measuring circuit.

6. A camera according to claim 5, wherein said luminance control circuit is arranged to control the luminance of light to be emitted by said light emitting means on the basis of the output of said light measuring circuit which is obtained while no light is emitted by said light emitting means.

7. A camera according to claim 5, wherein said light measuring circuit is disposed at a pentagonal prism portion of said camera.

8. A camera according to claim 6, wherein said light measuring circuit operates in response to an operation of an operation member of the camera, and said luminance control circuit latches the output of said light measuring circuit as obtained by the operation of the operation member to control the luminance of the light on the basis of the latched output.

9. A camera having a device for making a display within a viewfinder, comprising:
   a) a first display device for displaying information inside an image plane frame within the viewfinder;
   b) a second display device for displaying information outside said image plane frame within the viewfinder; and
   c) a control circuit for controlling periods of time for which said first and second display devices display the information, said control circuit having a timer means for causing said first display device to make the information display for a predetermined period of time and including prohibition means for prohibiting display by said second display device in response to an operation of an operation portion of the camera.

10. A camera according to claim 9, wherein said first display device is arranged to make a superimposed display inside the image plane frame.

11. A camera according to claim 9, wherein said information to be displayed by said first and second display devices relates to a state of focusing.

12. A camera according to claim 9, further comprising a focus detecting circuit arranged to detect a state of focusing, and an in-focus signal forming circuit arranged to form an in-focus signal when the state of focusing detected by said focus detecting circuit represents an in-focus state, said control circuit being arranged to operate in response to said in-focus signal in such away as to cause said first display device to make an in-focus display for a predetermined period of time and to cause said second display device to make an in-focus display for a period of time during which said in-focus signal is being formed.

13. A camera having a device for making a display within a viewfinder, comprising:
   a) a display device having a first display device for displaying information inside an image plane frame within the viewfinder and a second display device for displaying information outside said image plane frame within the viewfinder;

b) a light measuring circuit;

c) an exposure control circuit arranged to perform an exposure control on the basis of an output of said light measuring circuit; and d) an inhibition circuit arranged to inhibit said exposure control circuit from performing the exposure control on the basis of the output of said light measuring circuit obtained for a period of time during which the information is being displayed by said first display device, said inhibition circuit operation irrespectively of a display operation by said second display device.

14. A camera according to claim 13, wherein said exposure control circuit includes a computing circuit arranged to perform an exposure computing operation on the output of said light measuring circuit, and wherein said inhibition circuit is arranged to operate said light measuring circuit and said computing circuit after termination of a displaying action of said first display device in such a way as to take out the output of said light measuring circuit and to cause said computing circuit to perform a computing operation on the output taken out.

15. A camera according to claim 13, wherein said first display device includes light emitting means and is arranged to make a superimposed display of information inside said image plane frame within the viewfinder by using light emitted from said light emitting means.

* * * * *